March 6, 1934. A. POTDEVIN 1,949,880
BAG MAKING MACHINE
Original Filed July 9, 1929
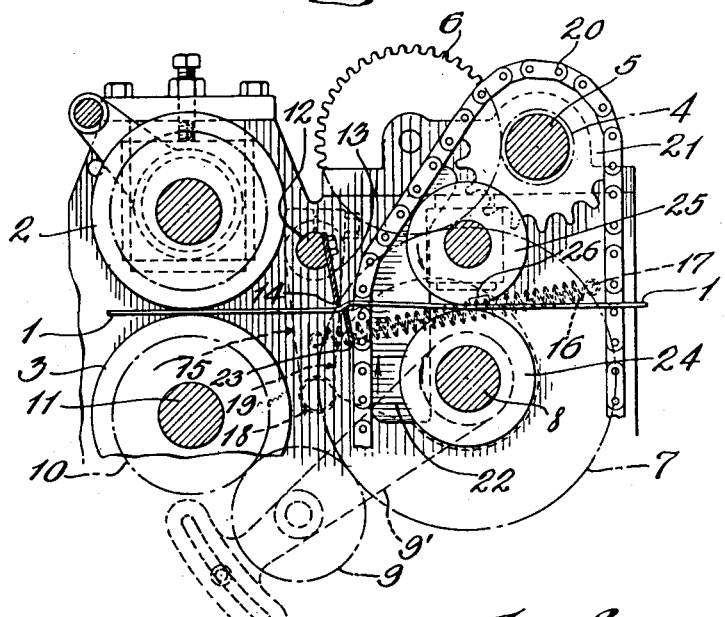
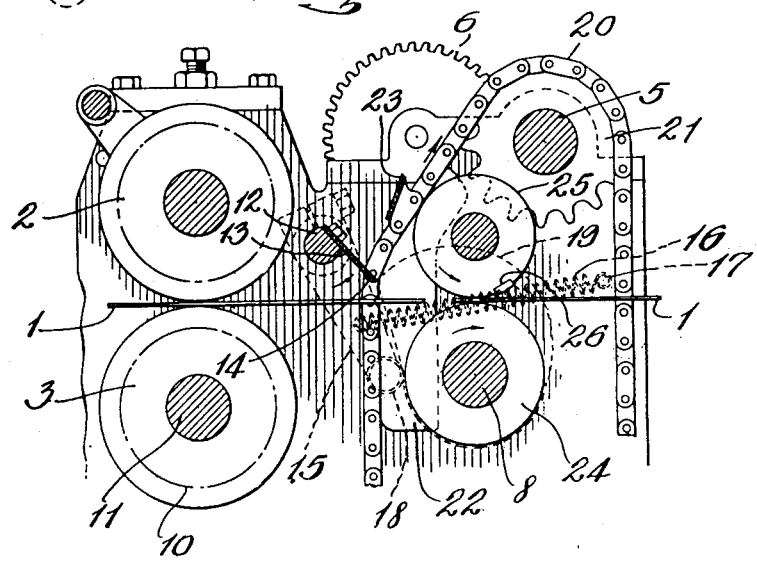
INVENTOR.
ADOLPH POTDEVIN
BY
ATTORNEYS.

Patented Mar. 6, 1934

1,949,880

UNITED STATES PATENT OFFICE 1,949,880

BAG MAKING MACHINE

Adolph Potdevin, Garden City, N. Y., assignor to Potdevin Machine Company, Brooklyn, N. Y., a corporation of New York Original application July 9, 1929, Serial No. 377,000. Divided and this application October 30, 1930, Serial No. 492,115

7 Claims. (Cl. 93—33)

My invention relates to an improvement in bag making machines and has for one of its objects the provision of improved means for cutting off or severing the paper tube into lengths as it comes through the machine and while the stock is in motion, this improved mechanism being of such a character as to eliminate adhering of the stock to the cutting member thereby insuring proper operation at all times.

This application is a division of my co-pending application Serial No. 377,000 filed July 9, 1929.

In the accompanying drawing:

Fig. 1 is a sectional view of the tube cutting or severing mechanism; and

Fig. 2 is a similar view showing the parts advanced subsequent to the cutting of the tube.

Referring to the drawing in detail, the paper stock designated 1 is fed into the machine between superimposed rollers 2 and 3. The roller 3 is driven through a suitable gear train comprising a gear 4 mounted on a drive shaft 5, an idler 6, gear 7 on the shaft 8, idler 9 on an adjustable arm 9' and meshing with a gear 10 mounted on the shaft 11 which carries the feed roller 3. The roller 2 is also driven through a suitable gear train.

The feed rollers 2 and 3 feed the stock to the right as viewed in the drawing and the next step is the severing of the tubes into predetermined lengths.

The severing or cutting mechanism which I am about to describe is of novel construction and I might mention in this connection that care has been exercised to insure the cutting mechanism freeing itself from the paper after each cutting operation. In advance of the feed rollers 2 and 3 I mount a shaft 12 carrying a movable cutting member or knife 13 provided with a serrated edge 14. This shaft also carries an arm 15 to which is attached one end of a coil spring 16, the other end of the spring being anchored as shown at 17. The lower end of the arm 15 carries a cam follower 18. The function of the spring 16 is to maintain the cam follower in engagement with a cam 19 carried by the shaft 8 on which is mounted the gear 7 as above referred to. The cam 19 as will be seen from the drawing is in advance of the arm 15 and hence any movement of the arm 15 under the action of the spring 16 is to the right or counter clockwise as indicated by the arrow shown in Fig. 2.

Adjacent to the cutting bar or knife 13 are endless members shown as sprocket chains 20 carried on sprockets 21 (the upper one only being shown). One lead of these chains as will be seen from the drawing rides over a shoe 22.

The endless members or chains 20 carry a continuously moving bar 23 which as will be hereinafter explained cooperates with the movable cutting member 13. The sprockets 21 are mounted on the main drive shaft 5.

Beyond the cutting or severing members 13 and 23 I provide pairs of superimposed retarding pinch rolls 24 and 25. Roll 24 is on the driven shaft 8 while the upper roll 25 is driven through a train of gears (not shown). The surface speed of the pinch rollers 24 and 25 is lower than that of the feed rollers 2 and 3, to retard the leading end of the stock so as to produce a slack in the tube when the cutting or severing members 13 and 23 function. This action will be described presently.

The pinch roll 25 is provided on its periphery with a pinch block 26. In the advancing of the stock prior to the cutting off operation the pinch rollers do not function but immediately prior to this operation the block 26 is rotated into position to pinch the stock between it and the lower roll and inasmuch as this pinch roll surface speed is lower than that of the stock speed the leading edge of the paper will be slowed up momentarily in advance of the cutting and severing mechanism and as the feed rollers 2 and 3 are advancing the stock forward it will be apparent that a slack will be formed in the stock. The mechanism is so timed that on the production of a slack in the tube the cutting member 13 and the bar 23 will have reached or have approximately reached the position shown in Fig. 1 consequently, on the continued upward movement of the bar 23 the tube will be carried against the serrated edge of the bar 13 and severed.

The chains 20 are moving clockwise to carry the bar beyond the stock as shown in Fig. 2 and at the same time due to the cam 19 and the spring 16 the knife or severing member 13 will be moved anti-clockwise away from the tube. This is a desirable operation and an advance over the art, as I know it, in that it eliminates all possibility of the tube adhering to the knife 13 and interrupting the successful operation of the machine and permits of the handling of stock which is handled with difficulty if at all with rotary types of cutting mechanism.

In connection with the cutting off operation it is to be noted that the lengths into which the stock is to be cut may be varied when desired by varying the size of the gear 10 which is permitted by the provision of the adjustable arm 9' thereby to vary the speed of the feed roller.

It is to be understood that various changes and modifications may be made in the structure herein illustrated and described without departing from the spirit and scope of my invention.

What I claim is:—

1. The combination of a movable cutting member, means for temporarily holding the leading portion of a tube, a bar, a flexible continuously moving support therefor, means for guiding said flexible support whereby the support moves said bar into juxtaposition to said cutting member intermediate the cutting member and holding means when the tube is temporarily held for the cutting operation, said cutting member at the same time moving forward and away from said tube.

2. The combination of a cutting member, means for positively oscillating said cutting member toward and away from an advancing tube, means in advance of the cutting member for temporarily checking the movement of the tube, a bar intermediate the cutting member and said checking means, adapted to be moved into cooperative position relatively to the cutting member to perform the cutting operation when the cutting member is moving in a direction away from the tube.

3. In a bag making machine, tube advancing rolls, tube checking rolls adapted momentarily to check the forward advance of the leading end of the tube, and a movable cutting member and a cooperating bar carried by a continuously moving endless flexible support intermediate said sets of rolls, the movements of the cutting member and bar being so timed that these two members are brought into cooperative relation during the temporary check in the advance of the forward part of the tube to perform the cutting operation while both the cutting member and bar are in motion.

4. In a bag making machine, the combination of a pivoted arm, a cutting member carried thereby, a continuously moving chain, a bar carried by said chain and cooperating with said cutting member, a cam for positively pivoting said arm and cutting member toward a tube to be cut or severed by the cooperation of said cutting member and bar, and a spring for moving the cutting member in the opposite direction.

5. The combination with a cutting member, a support therefor, means in advance of the cutting member for temporarily holding the leading portion of a tube, a bar cooperating with said cutting member intermediate the holding means and the cutting member, flexible endless members carrying said bar, supporting means for supporting and driving said endless members, and a guide for said endless members for guiding said bar into operative position with respect to said cutting member.

6. Cut off mechanism for bag making machines comprising in combination a pivoted arm, a cutting member carried by said arm, a cooperating continuously advancing bar, a cam for rocking said arm to move said cutting member intermittently toward said bar, said cutting member and bar being so positioned relatively that said bar will intermittently deflect a paper web, advancing between the cutting member and bar, into engagement with the cutting member to sever the web, the cutting member during the severing operation moving in the general direction of the paper travel and in an arc which is tangential to the path of travel of the undeflected portion of the web.

7. In a bag making machine the combination of an oscillatable cutting member located adjacent one face of a bag tube to be cut or severed, a cooperating bar, a continuously moving chain carrying said bar, means for oscillating said cutting member in timed relation to said bar to effect a cutting or severing of the bag tube, the axis of movement of said cutting member being in staggered relation to the axis of movement of the said bar and both axes being staggered with respect to the line of severance of the tube.

ADOLPH POTDEVIN.